United States Patent [19]
Funato

[11] Patent Number: 4,470,659
[45] Date of Patent: Sep. 11, 1984

[54] LIGHT BEAM SCANNING APPARATUS

[75] Inventor: Hiroyoshi Funato, Kanagawa, Japan

[73] Assignee: Ricoh Company, Ltd., Japan

[21] Appl. No.: 318,340

[22] Filed: Nov. 5, 1981

[30] Foreign Application Priority Data

Nov. 10, 1980 [JP] Japan .................. 55-157835
Nov. 12, 1980 [JP] Japan .................. 55-159332
Nov. 13, 1980 [JP] Japan .................. 55-159868

[51] Int. Cl.³ ............................................. G02B 27/17
[52] U.S. Cl. ............................................ 350/3.71
[58] Field of Search ................................. 350/3.71

[56] References Cited

FOREIGN PATENT DOCUMENTS 0157717 12/1980 Japan ................................. 350/3.71

OTHER PUBLICATIONS

Ih, C. S., "Holographic Laser Beam Scanners Utilizing an Auxiliary Reflector", Applied Optics, vol. 16, No. 8, Aug. 1977, pp. 2137-2146.

*Primary Examiner*—Bruce Y. Arnold
*Attorney, Agent, or Firm*—Guy W. Shoup

[57] ABSTRACT

A light beam scanning apparatus in which a plurality of mutually equivalent diffraction gratings, or a plurality of mutually equivalent converging holographic lenses, is arranged on a disc in a circle equidistantly and equidirectionally. The disc is revolved at a constant speed around an axis vertical thereto that passes through the center of the circularlly arranged diffraction gratings, or the like. A laser beam is projected incident upon one of the diffraction gratings or holographic lenses on the disc at a predetermined location from a predetermined direction. The laser beam is diffracted by the diffraction grating or the holographic lens, and after converging once, becomes a diverging beam incident upon a concave mirror with a spherical or spheroidal reflecting surface which re-converges the diverging beam on a scan plane. The light re-converged on the scan plane scans the scan plane in accordance with displacement relative to the incident laser beam of the diffraction gratings or the like that are caused by the disc revolution. Due to switching by the disc revolution of the diffraction gratings or the like from one to the next that the laser beam is incident upon, scanning of the scan plane is periodically repeated.

6 Claims, 18 Drawing Figures

LIGHT BEAM SCANNING APPARATUS

BACKGROUND OF THE INVENTION

This invention relates to a light beam scanning apparatus. A scanning method of scanning planes by a light beam has been recently developed for practical use, related to various reading equipment and printers, or equivalent. In response thereto, various proposals have been been made for the light beam scanning apparatus itself. For instance, an apparatus in which a laser beam is periodically deflected by a revolving polyhedral mirror is a typical example of apparatus of this kind.

Figure 1:
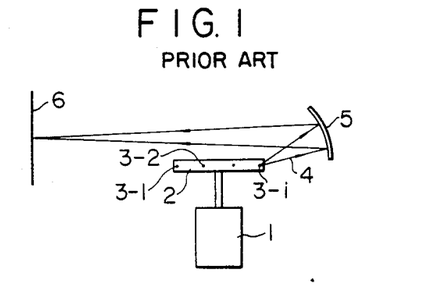
FIG. 1 is a schematic front view in explanation of the conventional technology.

One of the improvement objects for a light beam scanning apparatus has been directed towards simplification of the structure of the apparatus. As a matter of fact, a light beam scanning apparatus improved toward this object has been proposed, which is shown in FIG. 1.

A revolving disc 2 is securely mounted on the shaft of a motor 1 so as to be capable of revolving at a constant speed. On the peripheral surface of the revolving disc 2, a plurality of point light sources 3-1, 3-2, ..., 3-i, ... are equidistantly mounted. These point light sources 3-i are arranged to sequentially emit light in accordance with the revolution at a constant speed of the revolving disc 2, and as shown in FIG. 1, when the light source 3-i emits light, its diverging light beam 4 is reflected by a concave mirror 5 with a spherical reflecting surface, into a plane that is approximately parallel to the revolving disc 2, and is converged by the concave mirror 5 toward a scan plane 6. The concave mirror 5 is located in such a manner that the converging light beam reflected by the concave mirror 5 linearly scans the scan plane, regardless of the rotary displacement of the point light source 3-i.

Furthermore, by arranging the distance between the concave mirror 5 and the scan plane 6 to be adequately long, and convergence of the converging light beam to be adequately gradual, thereby making the so-called focal depth of the converging focal point sufficiently deep, the scan plane 6 can be scanned by a beam possessing a diameter that is substantially unchanged, in the direction normal to the plane of the figure, and due to the switching of the light emitting point light sources from one to the next, one and the same linear portion of the scan plane 6 can be scanned repeatedly.

This light beam scanning apparatus is disadvantageous in that a plurality of light sources is required, which will inevitably raise the cost of the apparatus, and in that as the light sources move, wiring for the circuits to energize the light sources becomes complicated.

SUMMARY OF THE INVENTION

It is therefore an object of the present invention to provide a light beam scanning apparatus from which the above-described conventional disadvantages are eliminated and which is structured in a simple style.

A light beam scanning apparatus according to the present invention has a disc on which are arranged a plurality of mutually equivalent diffraction gratings, or a plurality of mutually equivalent coverging holographic lenses, equidistantly and equidirectionally in a circle.

This disc, when scanning, is rotated at a constant speed around its center axis.

A laser beam is projected incident upon one of the diffraction gratings or holographic lenses on the disc at a predetermined position thereof from a predetermined direction. When diffraction gratings are arranged on the disc, the laser beam incident thereupon is provided with a converging property. When holographic lenses are arranged on the disc, the laser beam incident thereupon is converged by the converging property of the lenses themselves.

By the disc revolving at a constant speed, the diffraction gratings or the holographic lenses shift their positions relative to the incident laser beam, and the diffraction grating or equivalent that the laser beam is incident upon is switched sequentially from one to the next.

The laser beam projected incident upon a diffraction grating or a holographic lens is diffracted by the diffraction grating or the holographic lens, and after converging once, the laser beam becomes a diverging beam that is then incident upon a concave mirror.

This concave mirror has a spherical or spheroidal reflecting surface, and is arranged in a predetermined position.

The diverging light beam incident upon the concave mirror is again converged on the scan plane by the function of the concave mirror.

When the diffraction grating or equivalent is displaced relative to the incident laser beam by the revolution of the disc, the scan plane is scanned in synchronization with the displacement of the diffraction or equivalent by the light reconverged on the plane.

Since the diffraction grating or equivalent upon which the laser beam is incident is sequentially switched from one to the next by the revolution of the disc, scanning of the scan plane is repeated periodically in response to that switching.

According to the invention, only a single light source suffices for the scanning, so that the structure of the apparatus is simplified as compared with the conventional apparatus shown in FIG. 1, thereby eliminating the disadvantage of the conventional apparatus.

DETAILED DESCRIPTION OF THE PREFERRED EMBODIMENTS

In explaining the embodiments of a light beam scanning apparatus according to the invention, to alleviate complexity, the same reference numerals will be employed in FIG. 1 through FIG. 18, wherever the risk of confusion is believed not to exist.

Figure 2:
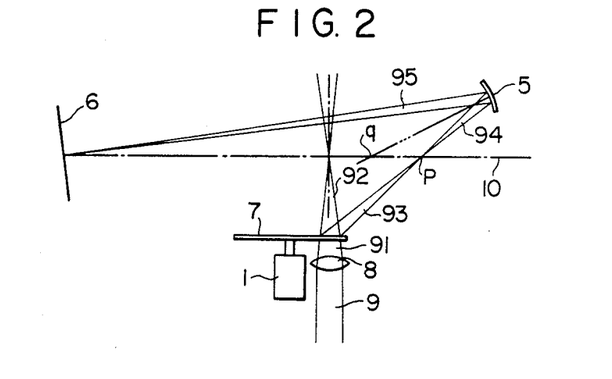
FIG. 2 is an explanatory front view showing an embodiment of a light beam scanning apparatus according to the invention.

For instance, in FIG. 2 which shows the first embodiment, reference numerals 1, 5 and 6 represent a motor, a concave mirror and a scanning plane, respectively, the same as in FIG. 1. To explain new reference numerals appearing in the figure, reference numeral 7 denotes a diffraction grating plate; numeral 8 a converging lens; and numeral 9 a parallel laser beam. Other reference numerals will be explained in the course of descriptions to follow.

Figure 3:
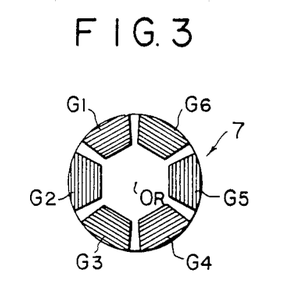
FIG. 3 is a plan view showing an example of an arrangement of diffraction gratings.

The existence of the diffraction grating plate 7 constitutes one of the key features of the present invention, and diffraction grating plate 7 is structured, for instance, as shown in FIG. 3.

To elaborate, the diffraction grating plate 7 is in the shape of a disc, and, on its periphery, is arranged a plurality of diffraction gratings (6 diffraction gratings G1, G2, ..., G6 in the example shown in FIG. 3). These diffraction gratings, G1 and others, are arranged on the circumference of a circle equidistantly and equidirectionally. Meant here by the equidirectional arrangement of diffraction gratings is that directions of grating in the diffraction gratings are equidirectional, that is, equidirectional with regard to the center $O_R$ of the diffraction grating plate 7. Also, the diffraction gratings, G1 and others, are completely equivalent to each other. That is to say, diffraction angles are mutually equal among those of any of the diffraction gratings.

The diffraction grating plate 7 is supported by the drive shaft of the motor 1, with the center $O_R$ of the diffraction grating plate 7 fixed to the drive shaft of the motor 1, and is arranged to rotate at a constant speed around an axis which is normal to the diffraction grating plate 2 and passes through the center $O_R$, by rotating the drive shaft of the motor 1.

At least a portion of the diffraction grating plate 7 where the diffraction gratings, G1 and others, are arranged, is of course transparent.

The motor 1 is disposed at a predetermined position within the apparatus, and the diffraction grating plate 7 is also rotated at a constant speed at a predetermined position within the apparatus.

A laser beam emitted from a laser source (not shown) is processed by an optical device (not shown), and is converted into a parallel light beam 9 which proceeds toward the diffraction grating plate 7 from the direction normal thereto, passes through a converging lens 8, thereby becoming a converging light beam 91, passes through the diffraction grating plate 7, and enters one of the diffraction gratings, G1 and others, that is positioned at this location. Then, by this diffraction grating, the converging laser beam 91 is divided into a straight travelling zero order light beam 92 and a diffracted light beam 93.

The straight travelling zero order light beam 92, after converging on the focal plane of the converging lens 8, becomes a diverging light beam. At the same time, the diffracted light beam 93 also converges at a point P that is on the focal plane of the converging lens 8, and subsequent thereto, becomes a diverging laser beam 94, which enters the concave mirror 5.

Figure 4:
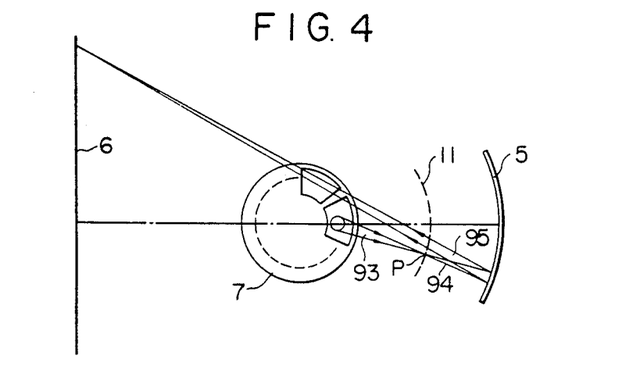
FIG. 4 is a plan view in explanation of the embodiment shown in FIG. 2.

Shifting of the converging light beam 93 will be explained. This light beam is a light beam diffracted by one of the diffraction gratings, G1 and others, but its diffraction angle is primarily determined by the lattice constant of the diffraction grating and by the wavelength of the laser beam 9. The direction of diffraction is also determined by the direction of the diffraction grating. On the other hand, since the diffraction grating plate 7 is rotated at a constant speed, the diffraction grating itself is also rotated at the same angular velocity as that of the diffraction grating plate 7. Accordingly, the diffracted laser beam 93 also takes on a revolving motion, but since the diffraction angle itself meanwhile does not change in any way, the light beam 93 takes on a precessing motion with the straight travelling zero order light (i.e., the undiffracted laser beam) as its axis. The locus on the focal plane 10 of the light beam 93, therefore, becomes the locus of a circular motion. FIG. 4 is a diagram of the apparatus shown in FIG. 2 as viewed from the above, where the arc shown by a broken line 11 indicates the locus of the converging point P of the light beam 93. Incidentally, when the number of diffraction gratings arranged on the diffraction grating plate 7 is n, the diffraction grating rotates approximately $2\pi/n$ radians, when the converging laser beam 91 remains incident upon one diffraction grating, so that the precession of the diffracted laser beam also is performed by about $2\pi/n$ radians. In other words, the locus of the converging point P of the diffracted converging laser beam 93 on the focal plane of the converging lens 8 becomes an arc that is approximately $1/n$ of a whole circle. Thus, when the converging point P follows the arc, the laser beam deviates from the diffraction grating, becoming incident upon an adjacent diffraction grating. Since the diffraction gratings on the diffraction grating plate 7 are completely equivalent to each other, their arrangement has been made equidirectional, the converging point P repeats shifting on the arc each time the diffraction grating that the converging laser beam 91 is incident upon is switched. In the embodiment shown in the figure, since n=6, the locus 11 of the point P becomes an arc that is approximately one sixth of a whole circle.

Now, the diffracted light that has converged at the point P subsequently becomes a diverging laser beam 94 incident upon the concave mirror 5, and is caused to become a converging scan beam 95 by the concave mirror 5. Thereafter, the converging scan beam 95 converges toward the scan plane 6. As can be seen when compared with the conventional apparatus shown in FIG. 1, this situation is identical to the case where shifting of the radiating point light source in FIG. 1 is replaced by shifting of the diffracted laser beam converging point P, and consequently the scan plane is linearly scanned by the apparatus according to the present invention. The concave mirror 5 has a spherical reflecting surface, and is arranged in such a manner to to provide reflection of the reflected light beam 95 in the direction to intersect the revolving plane of the diffraction grating plate 7.

Furthermore, instead of the concave mirror 5 having a spherical reflecting surface, a concave mirror with spheroidal reflecting surface may be used, where the spheroid is formed by rotating an ellipse, with the converging point P and a point on the scan line on the scan plane as its foci, around an axis normal to the motor revolving shaft that passes through a point q (FIG. 2) that is located between (i) the point where the zero order light having passed through the diffraction grating plate crosses with the optical axis and (ii) the converging point P of the primary order diffracted light. Also, the converging laser beam does not necessarily have to be projected vertically incident upon the diffraction grating.

In the embodiment shown in FIG. 2, the arranged location and facing angle of the concave mirror 5, as stated previously, are arranged in such a manner that, against the diffraction grating plate 7 and the converging laser beam 91, the scan line on the scane plane scanned by the scanning beam 95 is a straight line. This is the first characteristic of this embodiment. That is to say, if the location and facing angle of the concave mirror 5 are set as desired, the scan line is not always straight. Even if the scan line is not a straight line, as long as the scanning apparatus is used for reading out bar codes or the like, no particular disadvantage occurs, so that to make the scan line a straight line is not a mandatory requirement of the present invention, but still, the scan line being a straight line is advantageous in many cases including a case where the scanning apparatus is employed for a printer.

The second characteristic of the above-described apparatus is that the converging point P of the diffracted light beam 93 and the center of curvature q of the reflecting surface of the concave mirror 5, together with the scan line, are located within the same plane, that is, on the focal plane 10 of the converging lens 8, and that scanning beams are always caused to converge on the scan line by the scanning beam 95. By this second characteristic in conjunction with the first characteristic, linear scanning with a spot with the minimum beam diameter is feasible in the embodiment shown in FIG. 2.

The feasibility of scanning in a straight line signifies, for instance, that a drum-shaped photosensitive material for writing thereon can be scanned along the generating line thereof, and this is an extremely important condition for simplifying the structure of printer equipment.

Furthermore, that the scanning beam converges at an arbitrary point on the scan line, i.e., that scanning can be done by a beam spot with the minimum diameter, means the feasibility of maximizing the writing resolution, providing a great advantage when the apparatus is used as a printer.

One of the features of the present invention is that scanning beam 95 reflected by the concave mirror 5 can be arranged in such a direction that the scanning beam 95 intersects the revolving surface of the diffraction grating plate 7.

This general characteristic, when materialized in the form of the above-described second characteristic in linkage with the first characteristic, creates the unique effects described above, but it is possible by the general characteristic, to form a situation close to or similar to that of the embodiment shown in FIG. 2, whereby the advantages equal or similar to those of the embodiment in FIG. 2 can be obtained. Since, in a light beam scanning apparatus according to the invention, only one laser beam source suffices, the cost of the apparatus is low, and furthermore, since the position and incident direction of the laser beam entering the diffraction gratings are fixed, wiring for the light source energizing circuit is simple. Furthermore, high speed revolutions of the diffraction gratings can be done easily, since the diffraction grating can be formed in thin plates, which enables high speed scanning by a light beam.

As the diffraction gratings suitable for use in the invention, phase gratings or Blaise's grating having high diffraction efficiency are preferable. The diffraction gratings can be manufactured by a conventional method or by method utilizing holography.

Figure 5:
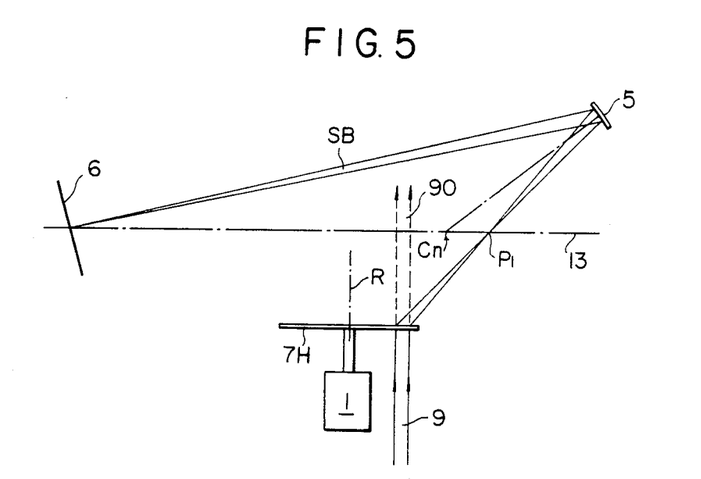
FIG. 5 is an explanatory front view showing another embodiment of the invention.
Figure 6:
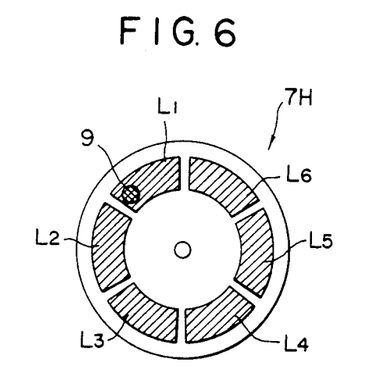
FIG. 6 is a plan view showing an example of an arrangement of holographic lenses.

In a second embodiment shown in FIG. 5, the reference numeral 7H denotes a holographic lens disc. The holographic lens disc 7H is structured, for instance, as shown in FIG. 6. Specifically, the holographic lens disc 7 is in the shape of a circular disc, in peripheral portion of which a plurality of holographic lenses (6 holographic lenses L1, L2, ..., L6 in the embodiment shown in FIG. 6) is arranged. These holographic lenses, L1 and others, are mutually equivalent, have a converging property, and are arranged equidistantly and equidirectionally.

Figure 7:
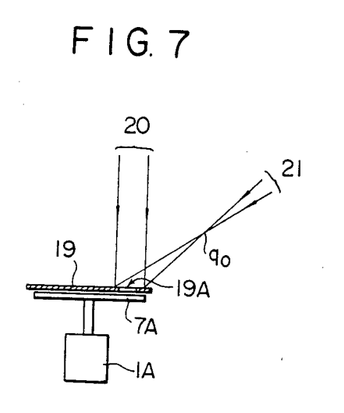
FIG. 7 is a diagrammatical view in explanation of a method of manufacturing the holographic lenses.

Taking the holographic lenses, L1 and others as an example, a method of manufacturing those holographic lenses will now be explained by referring to FIG. 7.

A photosensitive disc plate 7A for preparing the holographic lens dic 7H comprises a transparent base plate disc made of glass, plastics, or the like, and a photosensitive layer coated on one side of the transparent base plate disc, with its central portion fixed to the shaft of the motor 1A, and can be revolved by the motor 1A around an axis which is positioned normal to the photosensitive plate 7A and passes through the central portion of the transparent base plate disc.

A light shield plate 19 is disposed in close proximity to the photosensitive disc plate 7A. The light shield plate 19 is fixed and immovable, and in part thereof, a slit 19A in the same shape as the holographic lenses, L1 and others, shown in FIG. 3, is formed (refer to FIG. 8).

Figures 8, 9:
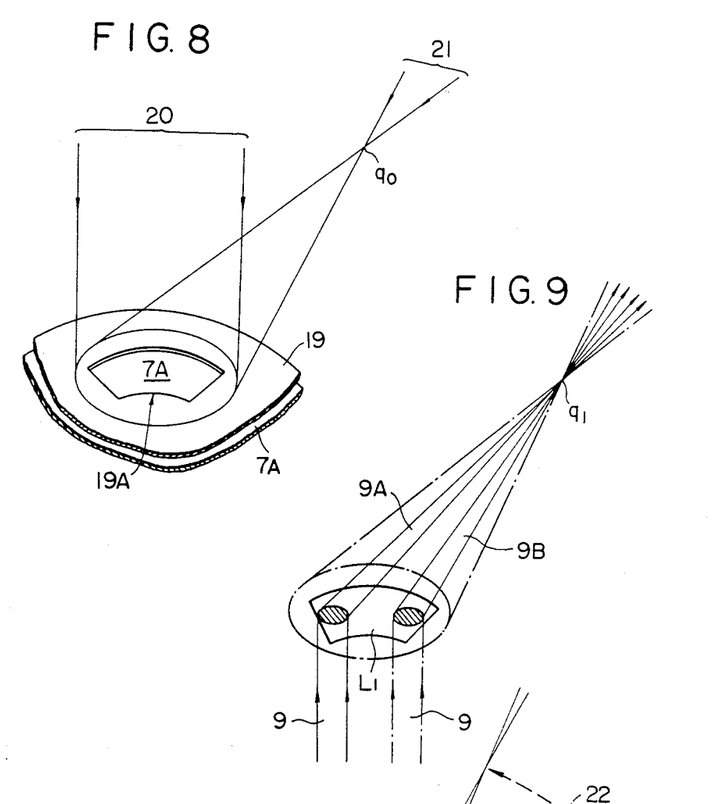
FIG. 8 is a perspective view in explanation of a method of manufacturing the holographic lenses.
FIG. 9 is a diagrammatical view in explanation of the function of the holographic lenses.

With this arrangement, the photosensitive disc plate 7A is disposed stationarily, and, from the direction normal to the photosensitive disc plate 7A, a parallel laser beam 20 is projected, through the slit, incident upon the photosensitive disc place 7A. At the same time, another laser beam 21 which can be interfered with the laser beam 20 and has converged at a point $q_O$, becoming divergent, is projected, through the slit, incident upon an incident area of the laser beam 20, and is caused to interferewith the laser beam 20. The resultant interference stripes are recorded. Incidentally, the laser beams 20 and 21 each have been enlarged so as to have a beam cross-sections in the incident area greater in size than the slit (FIG. 8).

The photosensitive disc plate 7A is then rotated by 60 degrees by the motor 1A, and the above-mentioned recording of interference stripes is repeated on a new photosensitive surface thus exposed of the photosensitive disc plate 7A. When the photosensitive plate 7A has made one complete revolution by repeating the above-mentioned process, the plate 7A is detached from the motor 1A, and developing, bleaching and other necessary processings are performed to convert the exposed portions of the disc surface into holographs, whereby the holographic lens disc 7H is obtained.

Now getting back to FIG. 5, the holographic lens disc 7H has its central portion fixed to the shaft of motor 1, and can be revolved at a constant speed around the axis which is normal to the disc and passes through the central portion of the hologram lens disc 7H.

The motor 1 is fixed at a predetermined position within the apparatus, so that the holographic lens disc 7H also is rotated at a constant speed at the predetermined position.

In FIG. 5, a laser beam emitting from the laser source (not shown) is processed by an optical device (not shown), converted into the parallel laser beam 9, and is projected incident upon one of the holographic lenses disposed on the lens disc 7H. This incidence is performed in the direction normal to the holographic lens disc 7H, which direction is opposite to that of the laser beam 20 employed in the manufacture of the lenses. The beam diameter of the parallel laser beam 9 is made adequately smaller than the area of the holographic lens as illustrated in FIG. 6.

Figure 10:
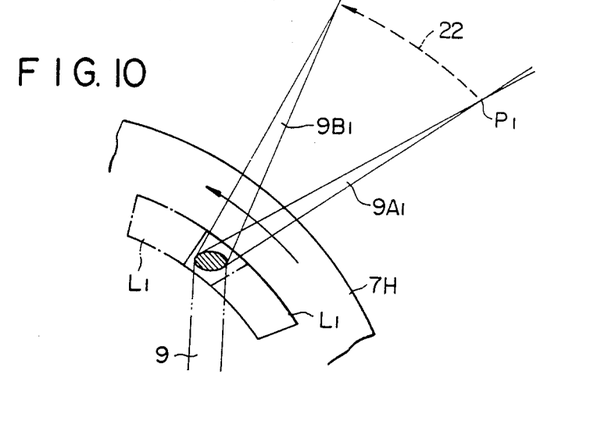
FIG. 10 is a diagrammatical view in explanation of the functions of the holographic lenses.

Referring to FIGS. 9 and 10, what will happen will now explained when the holographic lens disc 7H in the above arrangement is rotated at a constant speed. As shown in FIG. 9, if the parallel laser beam enters, for instance, the left end portion of the holographic lens L1, the light diffracted by the holographic lens becomes a converging light beam 9A, proceeds forward, converges at a point $q_1$, and then proceeds straight forward as diverging light. Since the holographic lens L1 thus diffracts the laser beam 9 for reproduction and converts it to a converging beam, the holographic lens L1 is called a converging lens. Similarly, when the parallel laser beam 9 enters the right end portion of the holographic lens L1, the diffracted light becomes a converging light beam 9B, proceeds straight forward, and converges at the same point $q_1$. The point $q_1$ is a point identical to the converging point $q_0$ of the light beam 11 in manufacturing the holographic lenses.

What will happen will now be exaplained if, as shown in FIG. 10, the disc 7H is rotated in the direction of the arrow, in the state where the parallel laser beam 9 is incident upon the holographic lens L1. In this case, the parallel laser beam 9 enters the left end portion of the lens L1 which is located at a position shown by solid lines in FIG. 10. The diffracted light proceeds straight forward as a converging light beam 9A, and converges at a point P1. If, in this state, the holographic lenses in FIGS. 9 and 10 were hypothetically superimposed upon each other, the direction of light beam 9A1 would be almost parallel to the direction of the light beam 9A. When the lens L1 is shifted to the position shown by the alternate long-and-short dash lines by rotation of the disc 7H, the diffracted light becomes a converging light beam 9B1. Similarly, if the holographic lens in this state is superimposed on the holographic lens in the state shown in FIG. 9, the direction of light beam 9B1 is almost parallel to light beam 9B.

The shift in light beams, from 9A1 to 9B1, is conducted continuously during shifting of the holographic lens L1, a result of which, locus 22 of the converging point P1 becomes an arc when shifting of the lens L1 is conducted along an arc. Only, the center axis of the arc of the point P1 locus does not coincide with the rotational axis R of the disc 7H.

Each time holographic lenses which the parallel laser beam 9 enters are switched by rotation of the disc 7H, the same thing repeats itself, and since all the holographic lenses are equivalent and equidirectional, the loci of the converging points of the converging diffracted light beams always become one and the same arc, while due to the equidistant arrangement of the holographic lenses, rotation of the diffracted light beam is repeated periodically. Furthermore, the arc drawn by shifting of the converging point exists in a plane that is parallel to the holograhpic lens disc 7H, and the plane is shown in FIG. 5 by reference numeral 13. The angle of deflection of the diffracted light beam by one holographic lens is, in the embodiment shown in the figure, slightly smaller than $2\pi/6$ since since six holographic lenses are provided.

Returning to FIG. 5, the diffracted laser beam that has once converged at the point P1, subsequently becomes a diverging laser beam, and enters the concave mirror 5, after which it is reflected by the concave mirror 5 as a scanning beam SB and converges toward the scan plane 6. Comparing this with the case shown in FIG. 1, it will be apparent that, since shifting of the light radiating point light source shown in FIG. 1 is totally equivalent with the shifting of the converging point P of the diffracted later beam, scanning of the scan plane 6 can also be performed by the apparatus shown in FIG. 2 in exactly the same manner as by the apparatus shown in FIG. 1.

Figure 11:
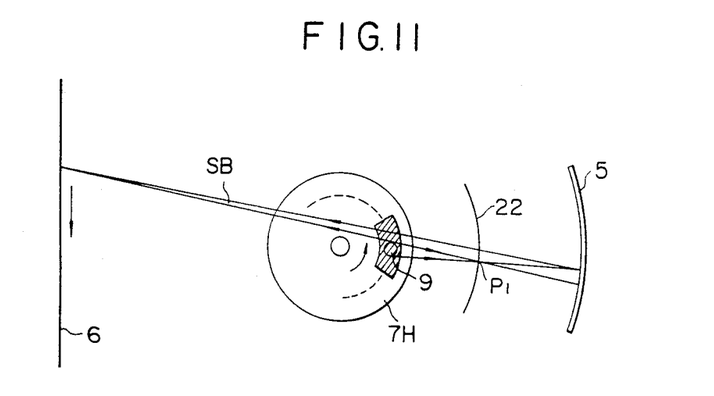
FIG. 11 is a plan view in explanation of the embodiment shown in FIG. 5.

FIG. 11 is a plan view showing a scanning state. Instead of employing the concave mirror 5, a concave mirror with a spheroidal reflecting surface can be employed, where the spheroid is obtained by rotating an ellipse with the converging point P1 and a representative point on the scan line on the scan plane as its two foci, around an axis which is normal to the holographic lens disc and passes through a point Cn in FIG. 12.

Also in this embodiment, the position of the concave mirror 5 is so arranged that the scan line by the scanning beam SB becomes a straight line on the scan plane 6. This can be done by adjusting the distance between the center of curvature Cn of the concave mirror 5 and the rotational axis R of the holographic lens disc 7H.

Furthermore, the converging point P1 of the laser beam diffracted by the holographic lens disc 7H, the center of curvature Cn of the concave mirror 5, and the scan line by the scanning beam SB are so arranged to be positioned on one and the same plane 13, in order that at any point on the scan line, the scanning beam SB can be converged. In other words, the spot by the scanning beam SB can be minimized across the entire range of the scanning line.

Furthermore, incidence upon the holographic lens disc 7H of the parallel laser beam which is the laser beam for reproduction, is so arranged that the conditions for reproduction of the hologram remain unchanged for the rotation of the holographic lens disc 7H. By this arrangement, scanning by the scanning beam SB is stabilized during scanhing operations.

The conditions for reproduction of holograms can also be unchanged if, instead of the vertical incidence of the parallel laser beam 9 to the holographic lens disc 7H, either converging light that converges at a predetermined point on the rotational axis R, or diverging light emitting from the predetermined point on the rotational axis R, is employed to illuminate the holographic lens disc 7H so as to be served as the laser beam for reproduction. In this case, the holographic lens disc is manufactured through an adequate choice of object light and reference light suitable for the hologram reproduction light (illuminating light).

One of the features of the present invention is that the direction of the scanning beam reflected by the concave mirror 5 is arranged in such a direction as to intersect the rotational surface of the holographic lens disc 7H.

By this general characteristic, a state that is nearly the same as, or similar to, the state of the embodiment shown in FIG. 5 can be set up, thereby providing the same or similar advantages as in the case of the above-mentioned embodiment.

On the other hand, in the embodiment shown in FIG. 5, the points P1 and Cn, and the scan line are located in one and the same plane 13, and at the same time, the optical axis of the concave mirror 5 also is on the plane 13. As is well known, the concave mirror 5 performs its image-forming function best in the paraxial region. In scanning systems employing holographic lens discs, however, as is evident from the situation shown in FIG. 5, it is required that holographic lenses with large diffraction angles be employed in order to utilize the concave mirror paraxial region. However, in order to obtain holographic lenses with large diffraction angles, as is well known, high resolution recording capability is required in recording materials. This will significantly narrow the choice range of applicable recording materials. If the concave mirror paraxial region cannot be utilized, image formations by the concave mirror will involve astigmatisms.

Figure 12:
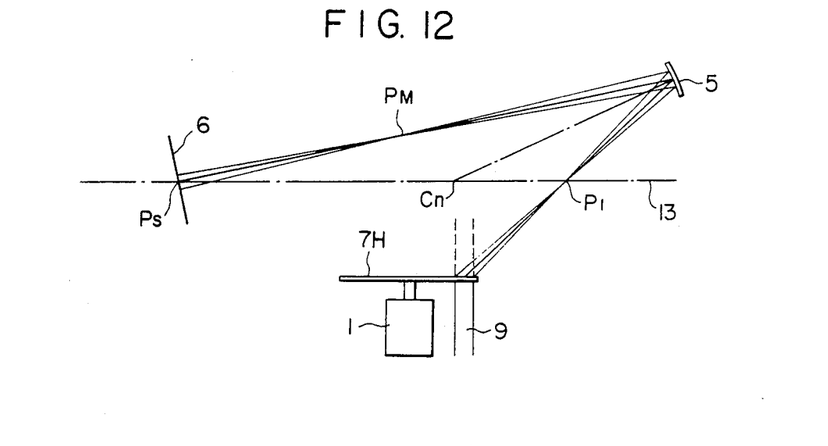
FIG. 12 is a front view in explanation of the disadvantages caused by aberrations that may be generated by a concave mirror.
Figure 13:
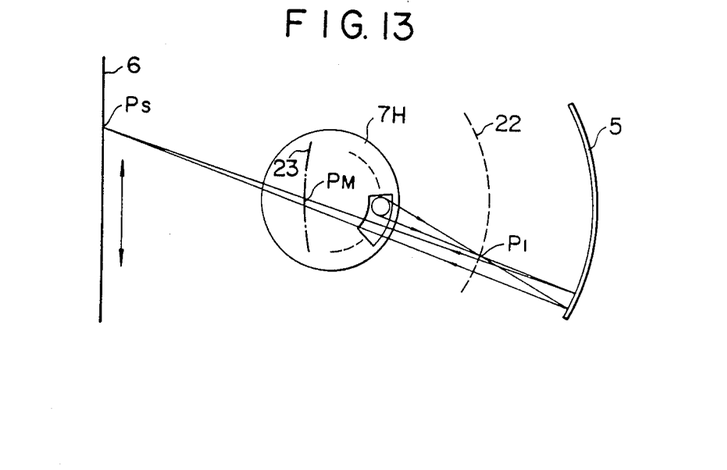
FIG. 13 is a plan view in explanation of the disadvantages mentioned above.

This will now be explaned more specifically by referring to, for instance, FIG. 12 that is analogous to FIG. 5, and FIG. 13 that is analogous to FIG. 11. In the examples shown in FIGS. 12 and 13, sagittal rays (light components vertical to the plane of FIG. 12) converge at the point $P_S$, that is, on the scan plane 6, but meridional rays (light components within the plane of FIG. 12) converge at the point $P_M$ the chain line in FIG. 13 indicating the locus of the point $P_M$). In this case, the spot on the scan plane 6 is in the shape of an ellipse elongated in the direction normal to the scan line. Regardless of any adjustments in the position of the scan plane, as long as this astigmatism is not eliminated, it is not possible to obtain an infinitesimal spot, that is, a spot where both sagittal and meridional rays converge. This creates a substantial obstacle in improving resolution in recorded images when the scanning system is employed as a printer.

This problem can be solved by manufacturing the holographic lenses by a method as will be described below.

Figure 14:
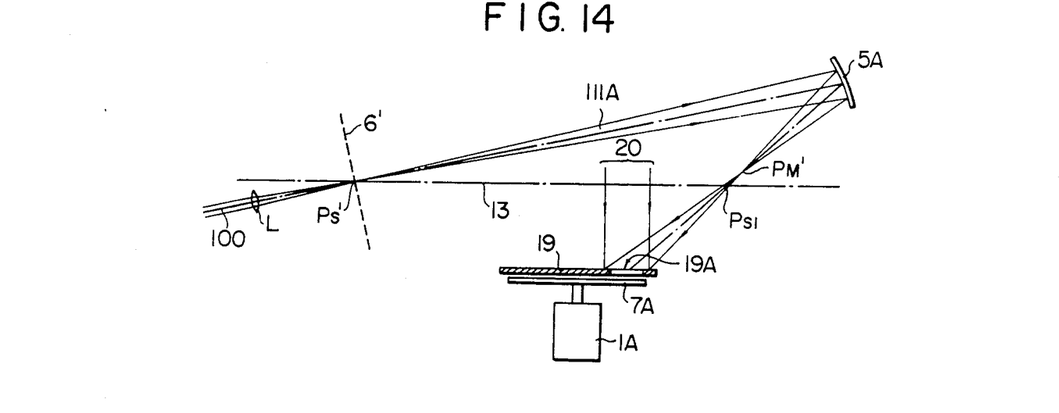
FIG. 14 is a front view in explanation of a method of manufacturing the holographic lenses that are capable of eliminating the disadvantages mentioned above.

FIG. 12 shows the positional relationship among the holographic lens disc, the concave mirror and the scan plane. When performing scanning operations, a photosensitive disc 7A which is used as the holographic lens disc later, and a concave mirror 5A that is equivalent to the concave mirror 5 are arranged in an identical positional relationship as the holographic lens disc 7H and the concave mirror 5 in FIG. 12. This arrangement is shown in FIG. 14. The photosensitive disc 7A is arranged to be rotatable by motor 1A, and a light shield plate 19 is also provided.

By determining the positional relationship of the photosensitive disc 7A and the concave mirror 5 equal to the positional relatinship of the holographic lens disc 7H and the mirror 5, a plane 6' corresponding to the plane 6 is determined with respect to both the photosensitive disc 7A and the concave mirror 5. A point $P_S'$ corresponding to the scan line central region is obtained on the plane 6', and a light source for object light is provided at this point $P_S'$.

Figure 15:
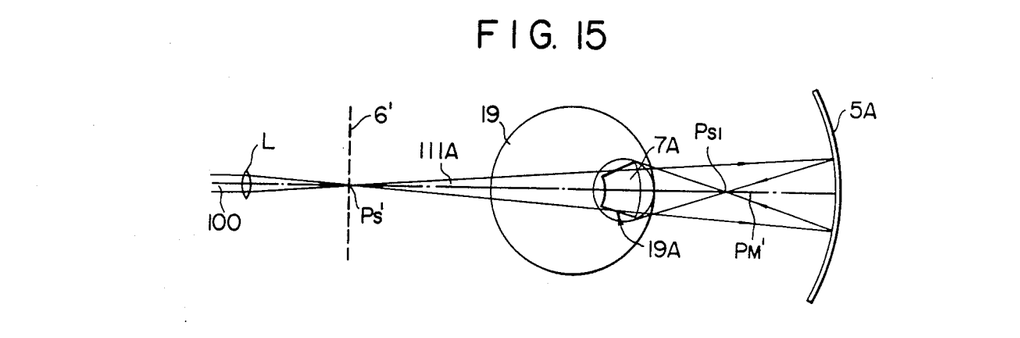
FIG. 15 is a plan view in explanation of a method of manufacturing the above-mentioned holographic lenses.

This light source for illuminating object bodies is obtained by converting a parallel laser beam 100 to a converging beam with a lens L and by making it converge at the point $P_S'$. A diverging light beam 111A from this light source enters the concave mirror 5A, is reflected, and becomes a converging light beam. This converging light beam, then, forms an image of the light source, but if light reflected by the concave mirror 5A is caused to be incident upon the photosensitive disc 7A at the aperture position 19A of the light shield plate 19, the paraxial region of the concave mirror 5A cannot be utilized, and consequently, astigmatisms emerge in the image formation. That is to say, meridional rays converge at the point $P_M'$ and sagittal rays converge at the point $P_{S1}'$, with the two light converging points not coinciding with each other. The converging status of sagittal rays is clearly shown in FIG. 15. Subsequent to this, the light beam reflected by the concave mirror 5a becomes diverging and enters the photosensitive disc 7A at the aperture 19A position of the light shield plate 19. Then, it interferes with the reference light 10, and the interference status is recorded on the disc 7A.

Thus, the object light beam 111A becomes a diverging light beam after its meridional and sagittal rays have converged at different points, and enters the hologram recording medium, but in this specification, it is expressed as entering the hologram recording medium as a diverging light beam after converging once. The subsequent hologram recording is the same as those described with reference to FIGS. 7 and 8.

Figure 16:
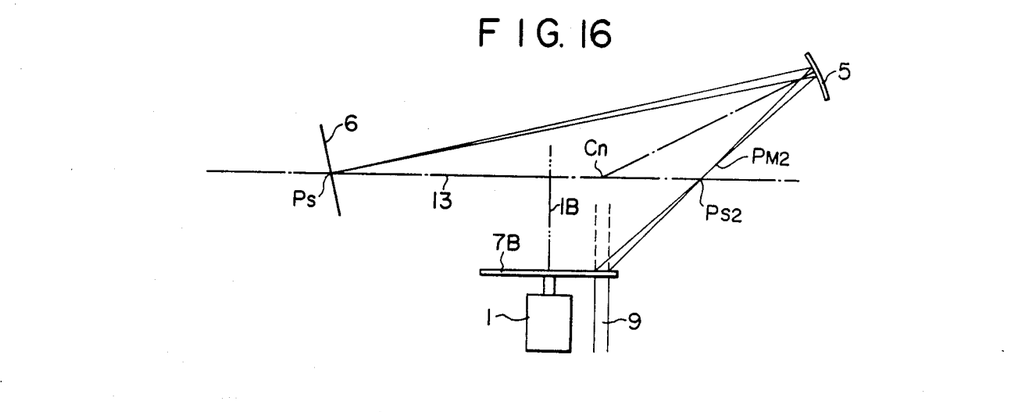
FIG. 16 is an explanatory front view of a further embodiment of a light beam scanning apparatus.
Figure 17:
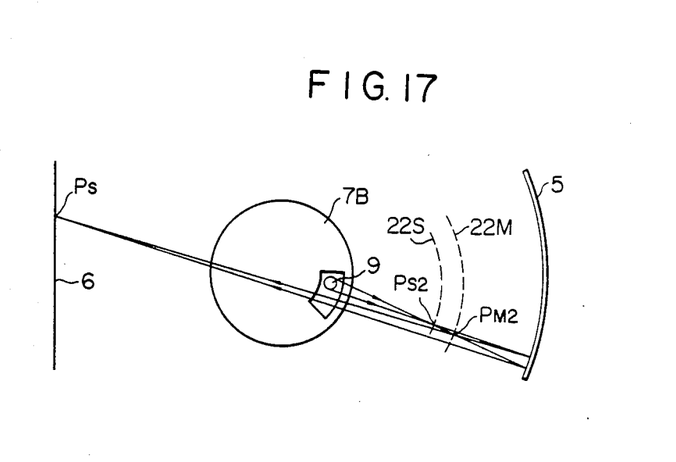
FIG. 17 is a plan view in explanation of the embodiment shown in FIG. 16.

The third embodiment shown in FIGS. 16 and 17 employs a holographic lens disc 7B thus manufactured. FIG. 16 is a front view of the holographic lens disc 7B, and FIG. 17 a plan view of the same. Light diffracted by the holographic lens enters the concave mirror 5 after converging once, gets reflected, and becomes a converging light beam. To elaborate, sagittal rays converge once at the point $P_{S2}$ and meridional rays converge once at the point $P_{M2}$, after which they enter the concave mirror 5. Light reflected by the concave mirror 5 becomes a converging light beam and converges toward the scan plane 6. Image formation by the concave mirror 5 is still accompanied by astigmatisms, but in this case, the diffracted light beam itself that is incident upon the concave mirror 5 has aberrations that are in accordance with the astigmatisms by the concave mirror 5. In other words, the light beam incident upon the concave mirror 5 has its sagittal ray component and meridional ray component with varying converging points. For this reason, the light beam reflected by the concave mirror 5 converges on the scan line on the scan plane 6, including both its sagittal and meridional ray components. The two ray components accurately converge on the scan line only when light diffracted by the holographic lens proceeds in the optical path of the object light beam 111A in the reverse direction, that is, when light reflected by the concave mirror 5 converges in the central portion of the scan line, so that as the point of convergence shifts toward the ends of the scan line, astigmatisms emerge, even though slightly. However, the astigmatism at such level is virtually unnoticeable under usual scanning conditions, and in substance, scanning can be done by eliminating astigmatic effects that have hitherto been a problem. In FIG. 17, reference numerals 22S and 22M denote the loci of points of convergence for sagittal ray and meridional ray components of the diffracted light.

Finally a specific example related to the third embodiment according to the invention will now be explained.

Employed for the concave mirror was one with a radius of curvature of 100 mm, and for the holographic lens disc 7B was one with a distance of 10.4 mm between its central axis 1B (FIG. 16) and the position of incidence of the laser beam for reproduction 9, and with a diffraction light angle of 45 degrees as measured from the non-diffracted component beam of the laser beam 9, where the concave mirror 5 was so arranged as to provide a distance of 14.3 mm between its center of curvature S and the central rotational axis 1B of the holographic lens disc 7B, thus structuring a scanning apparatus as shown in FIGS. 16 and 17.

Figure 18:
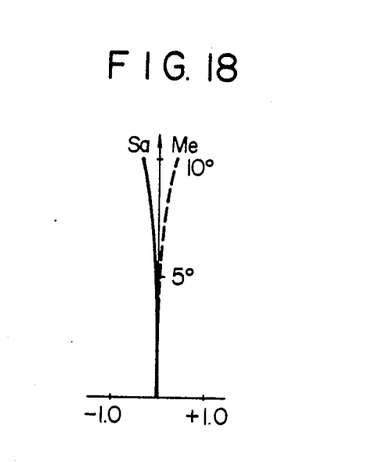
FIG. 18 is an aberration diagram showing an example of aberrations of the holographic lenses manufactured by the method shown in FIG. 13.

Arranged on the holographic lens disc 7B were 15 holographic lenses each measuring 20 degrees in angle as viewed from the central axis. Astigmatisms exhibited under this arrangement with reference to rotational angle of the holographic lens disc were extremely small, as shown in FIG. 18. A printer was built employing this prototype scanning apparatus and high resolution recording were successfully performed.

In the above, there is described a case where parallel laser beams are employed, which are incident vertically upon the holographic lens disc for reference light and reproducing it, but the present invention is not limited to such cases. Light beams diverging from a point on the rotary axis of the holographic lens disc, or light beams converging to a given point on the rotary central axis can also be employed for reproducing light. In such cases, it goes without saying that as reference light, light beams that are conjunctive with the diverging or converging light beams are employed.

As a matter of course, holographic lenses may also be manufactured separately and mounted on a transparent disc to form a holographic lens disc.

Furthermore, this invention can also be applied to reflecting types of holographic lenses in addition to transmitting types described in the foregoing.

What is claimed is:

1. A light beam scanning apparatus comprising:
    a diffraction grating plate on the peripheral portion of which a plurality of diffraction gratings are arranged in a circle equidistantly and equidirectionally;
    a device for revolving said diffraction grating plate at a constant speed around an axis which is normal to said diffraction grating plate and passes through a center of said circle;
    a device for projecting a converging laser beam so as to be incident upon one of said diffraction gratings at a predetermined location from a predetermined direction; and
    a concave mirror having a spherical or spheroidal reflecting surface that reflects the laser beam, which has been diffracted by said diffraction grating, passed through a convergence point, and is thus diverging upon being incident on said concave mirror, in the form of a scanning beam in the direction of a scan plane, and makes said scanning beam reconverge toward the scan plane, said scanning beam forming a scan line on the scan plane with the revolving of said diffraction grating plate,
    wherein said concave mirror is arranged relative to the diffraction grating plate and the diffracted laser beam such that the convergence point of the diffracted laser beam, the center of curvacture of said mirror, and the scan line are all in one and the same plane, and the scanning beam always converges on the scan line.

2. A light beam scanning apparatus as in claim 1, wherein said concave mirror has a spherical surface as reflecting surface, and the position in which said concave mirror is arranged is determined in such a manner that in relation to said diffraction grating plate and said converging laser beam, the scan line by the scanning beam on the scan plane is a straight line.

3. A light beam scanning apparatus as in claim 1, wherein the converging laser beam is projected so as to be normally incident upon said diffraction grating plate.

4. A light beam scanning apparatus comprising:
    a holographic lens disc on the peripheral portion of which a plurality of equivalent, converging holographic lenses are arranged in a circle, equidistantly and equidirectionally;
    a device for revolving said holographic lens disc at a constant speed around an axis which is normal to said holographic lens disc and passes through the center of said circle;
    a device for projecting a laser beam so as to be incident upon one of the holographic lenses on said holographic lens disc at a predetermined location in a predetermined direction; and
    a concave mirror having a spherical or spheroidal reflecting surface that reflects the laser beam, which has been diffracted and converged by said holographic lens and has passed through a convergence point so as to become diverging upon being incident on said concave mirror, in the form of a scanning beam in the direction of a scan plane, and makes said scanning beam reconverge toward the scan plane, said scanning beam forming a scan line on the scan plane with the revolving of said holographic lens disc,
    wherein said concave mirror is arranged relative to the holographic lens disc and the diffracted laser beam such that the convergence point of the diffracted laser beam, the center of curvature of said mirror, and the scan line are all in one and the same plane, and the scanning beam always converges on the scan line.

5. A light beam scanning apparatus as in claim 4, wherein said concave mirror has a spherical surface as reflecting surface, and the distance between the rotational center axis of said holographic lens disc and the center of curvature of said concave mirror is so determined that the scan line by the scanning beam on the scan plane is a straight line.

6. A light beam scanning apparatus as in claim 4, wherein the laser beam or reproduction is arranged to be normally incident upon said holographic lens so as to maintain conditions for reproduction of holograms unchanged in relation to the holographic lens disc revolution.

* * * * *